(12) United States Patent
Hatherill et al.

(10) Patent No.: US 7,234,833 B2
(45) Date of Patent: Jun. 26, 2007

(54) WORK LIGHT

(76) Inventors: Richard Anthony Hatherill, 378 Hamilton Avenue South, Ottawa, Ontario (CA) K1Y 1C7; John Leslie Schira, 50 Dovercliffe Road, Guelph, Ontario (CA) N1G 3A6; Heather Frances Britt, 15 Borduas Court, Kanata, Ontario (CA) K2K 1K9

( * ) Notice: Subject to any disclaimer, the term of this patent is extended or adjusted under 35 U.S.C. 154(b) by 14 days.

(21) Appl. No.: 10/815,350

(22) Filed: Mar. 31, 2004

(65) Prior Publication Data

US 2005/0225968 A1 Oct. 13, 2005

(51) Int. Cl.
*F21L 4/04* (2006.01)

(52) U.S. Cl. .................... 362/198; 362/191; 362/199; 362/240; 362/241; 362/396; 362/398; 362/800

(58) Field of Classification Search ........ 362/183–191, 362/197–199, 227, 232, 249–251, 800, 167, 362/418–419, 427–428, 396, 398
See application file for complete search history.

(56) References Cited

U.S. PATENT DOCUMENTS

| | | | |
|---|---|---|---|
| 3,970,837 A | 7/1976 | Helm | |
| 4,321,660 A | 3/1982 | Sokol | |
| 4,342,953 A * | 8/1982 | Collins | 320/136 |
| 4,564,894 A | 1/1986 | Gonzalez | |
| D312,316 S | 11/1990 | Molony et al. | |
| D319,511 S | 8/1991 | Humphrey | |
| D320,466 S | 10/1991 | Muzquiz | |
| D324,109 S | 2/1992 | Caridi | |
| 5,213,412 A * | 5/1993 | Ciallella | 362/398 |
| D339,425 S | 9/1993 | Anderson | |
| 5,243,505 A | 9/1993 | Carr | |
| 5,457,614 A | 10/1995 | Duty | |
| 5,457,619 A | 10/1995 | Ewing | |
| 5,463,538 A | 10/1995 | Womack | |
| 5,528,477 A | 6/1996 | Carmo | |
| D389,931 S | 1/1998 | Kovacik et al. | |
| D391,655 S | 3/1998 | Hughes | |
| 5,782,553 A * | 7/1998 | McDermott | 362/245 |
| D408,091 S | 4/1999 | Joyner et al. | |
| 5,921,658 A | 7/1999 | Kovacik et al. | |
| 6,109,766 A * | 8/2000 | Baliozian | 362/287 |
| 6,140,776 A * | 10/2000 | Rachwal | 315/200 R |
| D436,204 S | 1/2001 | Leen | |
| 6,169,373 B1 | 1/2001 | Riesinger | |
| D446,592 S | 8/2001 | Leen | |
| D450,147 S | 11/2001 | Leen | |
| 6,357,893 B1 * | 3/2002 | Belliveau | 362/285 |
| 6,386,736 B1 | 5/2002 | Reiff et al. | |
| 6,428,181 B1 | 8/2002 | Moriarty | |
| D465,591 S | 11/2002 | Krieger et al. | |
| 6,511,214 B1 | 1/2003 | Parsons et al. | |
| 6,585,395 B2 * | 7/2003 | Luk | 362/250 |
| 6,619,813 B1 | 9/2003 | Schnell | |
| 2002/0006039 A1* | 1/2002 | Ueda et al. | 362/217 |
| 2002/0030994 A1* | 3/2002 | Krietzman et al. | 362/259 |
| 2002/0085390 A1* | 7/2002 | Kiyomoto et al. | 362/555 |
| 2002/0191396 A1 | 12/2002 | Reiff et al. | |
| 2004/0141316 A1* | 7/2004 | Twardawski | 362/184 |
| 2004/0155844 A1* | 8/2004 | Stopa | 345/82 |
| 2004/0223342 A1* | 11/2004 | Klipstein et al. | 362/555 |
| 2005/0018435 A1* | 1/2005 | Selkee et al. | 362/427 |

* cited by examiner

*Primary Examiner*—Sandra O'Shea
*Assistant Examiner*—Jason Moon Han
(74) *Attorney, Agent, or Firm*—Bingham McCutchen LLP

(57) ABSTRACT

A work light having one or more light emitting diodes (LEDs) to provide a high intensity beam pattern. In one arrangement two LEDs are tilted away from each and in another arrangement one LED is used together with a shaped reflector to provide an elliptical beam.

1 Claim, 6 Drawing Sheets

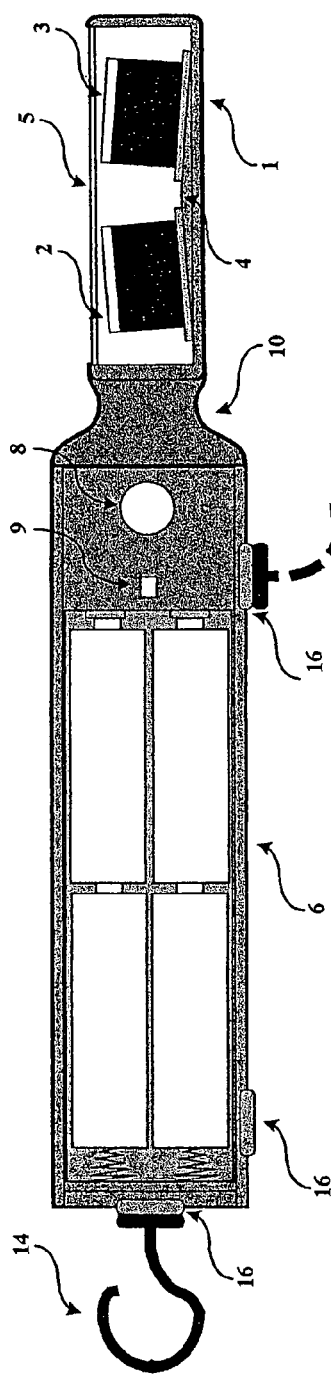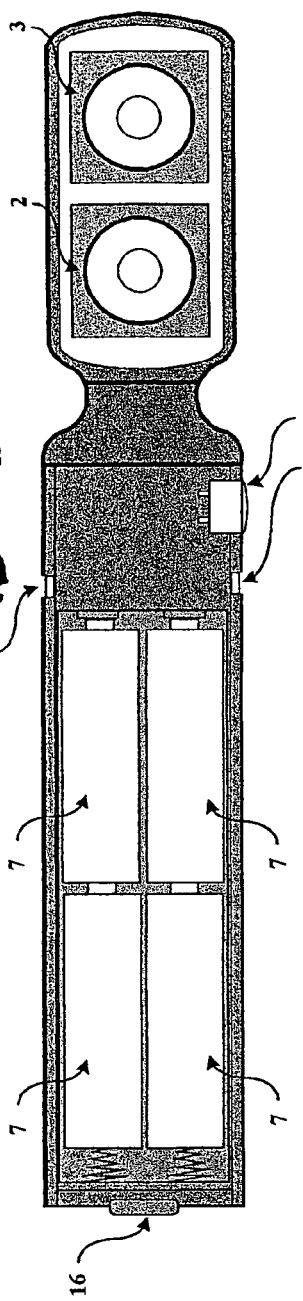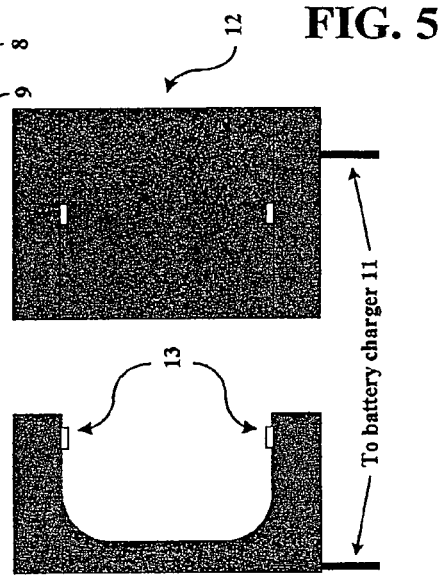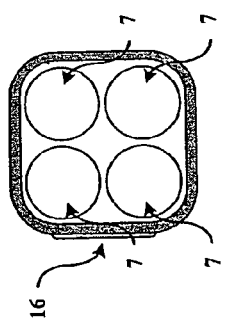
FIG. 2
FIG. 1
FIG. 3
FIG. 4
FIG. 5

WORK LIGHT

FIELD OF THE INVENTION

This invention relates to lights for illuminating a work area. These are generally referred to as work lights.

Technicians and mechanics working on machinery require good illumination over a limited work area. Fluorescent lamps have previously been used in preference to incandescent lamps but they have the disadvantage that they require a significant amount of voltage and power to operate and have a thin glass tube which can easily be broken in work areas. The power required means that they can only be operated for a short period of time on batteries and they therefore generally require a power cord. The power cord obstructs the work area and limits mobility.

To overcome the above-mentioned disadvantages it has been proposed to use light emitting diodes (LEDs) which are advanced technology devices that provide a high intensity light output.

SUMMARY OF THE INVENTION

It is an object of the present invention to provide a work light which overcomes the above-mentioned disadvantages utilizing LEDs in a particular manner to provide greater utility.

According to one aspect of the invention there is provided a work light comprising at least two LEDs tilted away from each other to provide, in use, a high intensity beam pattern.

The two LEDs may be tilted away from each other to provide, in use, an elliptical beam pattern.

The work light may include an electronic circuit to provide a constant current to said LEDs and wherein said electronic circuit comprises a switching regulator.

According to another aspect there is provided a work light comprising at least two LEDs tilted away from each other at an offset angle to each other to provide, in use, a high intensity elliptical beam.

Embodiments of the present invention will now be described, by way of example, with reference to the accompanying drawings in which:

FIG. 1 is a diagrammatic plan view of one embodiment of a work light partly in open view;

FIG. 2 is a diagrammatic side view of the work light of FIG. 1;

FIG. 3 is a cross-sectional view of the work light of FIG. 1 at the location of the batteries;

FIGS. 4 and 5 diagrammatically illustrate a battery charging cradle; and

Figure 6:
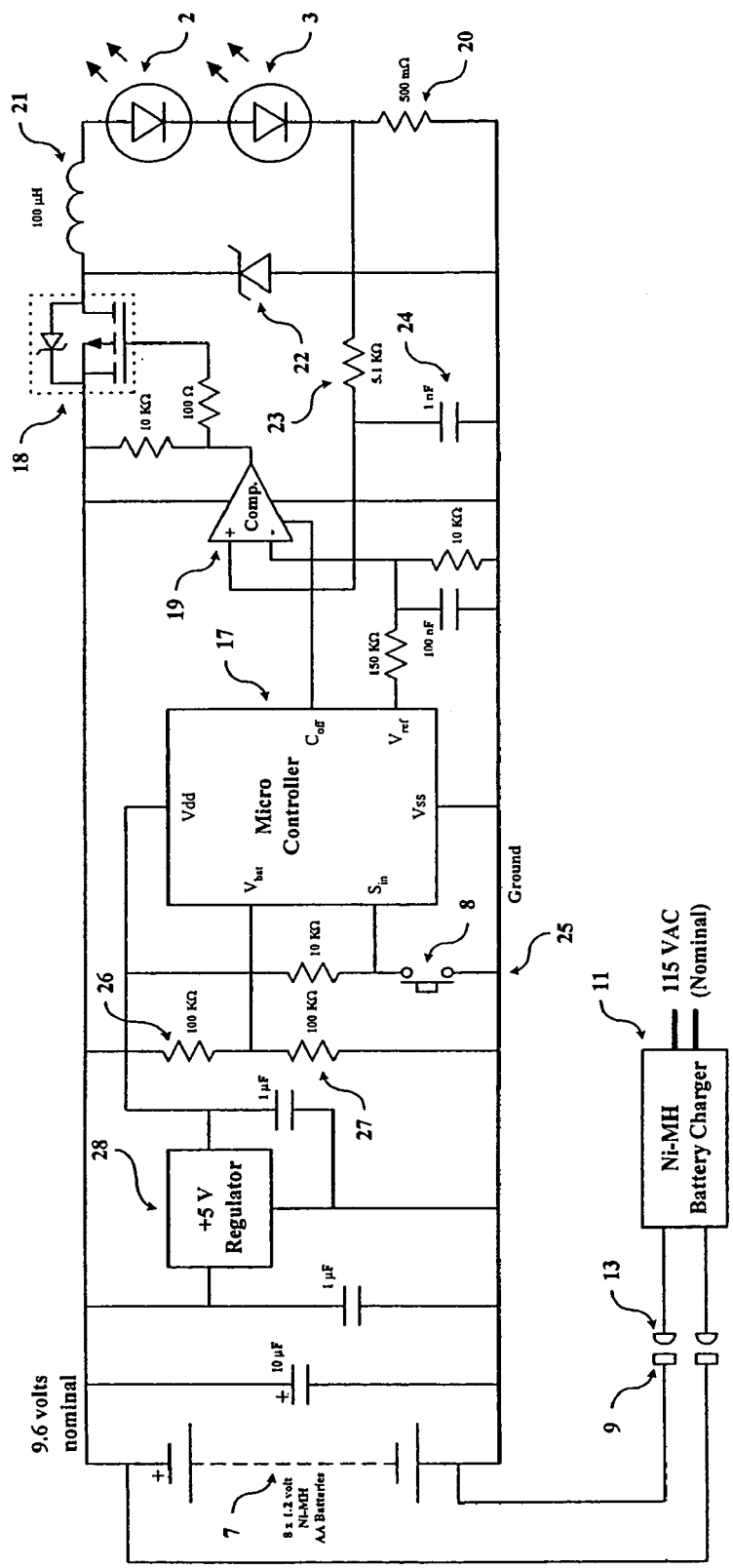

FIG. 6 is an electronic circuit for a work light utilizing a switching regulator.

The same reference numerals are used throughout the figures for like parts.

Figure 7:
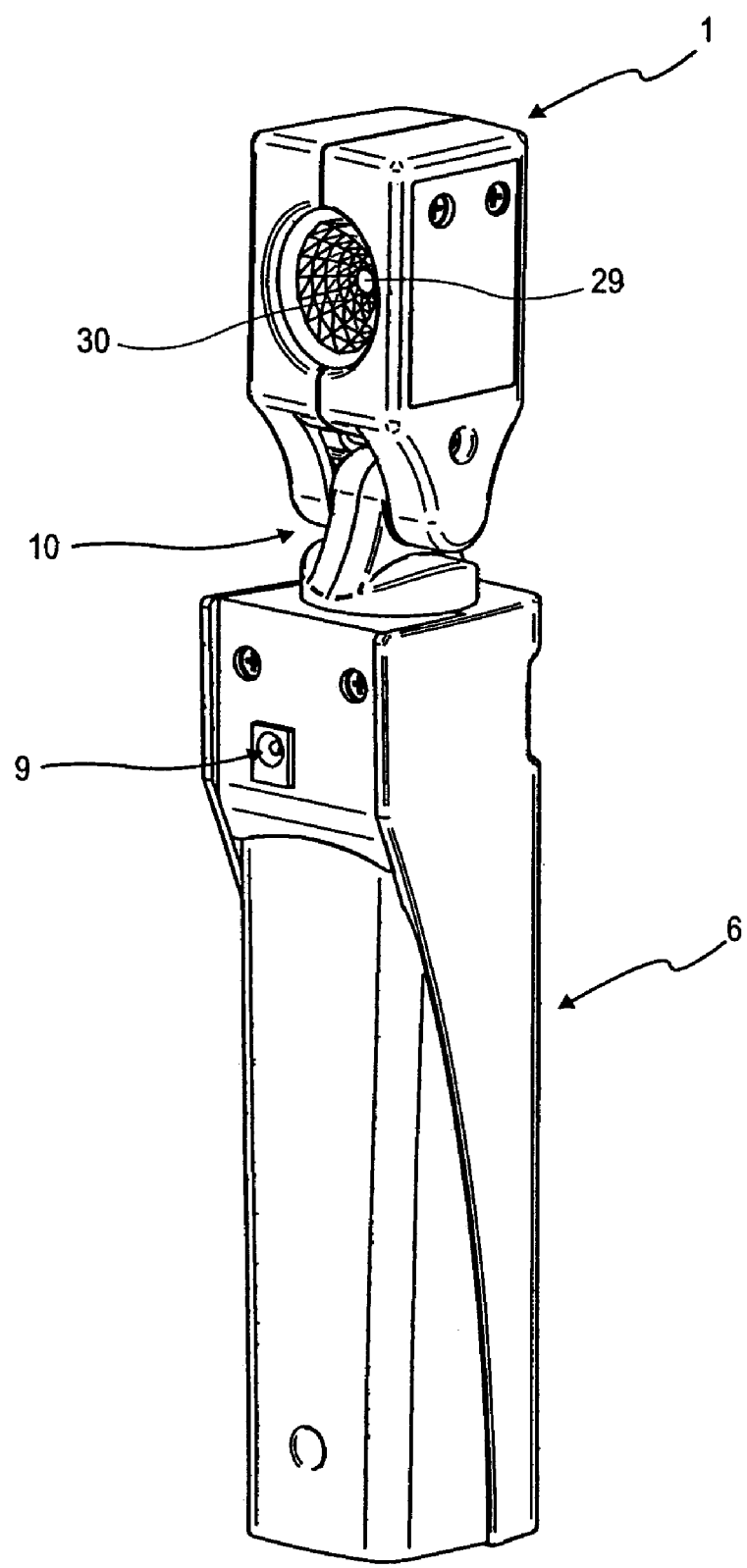

FIG. 7 is a three-dimensional view of a worklight with a single LED and a shaped reflector.

Figure 8:
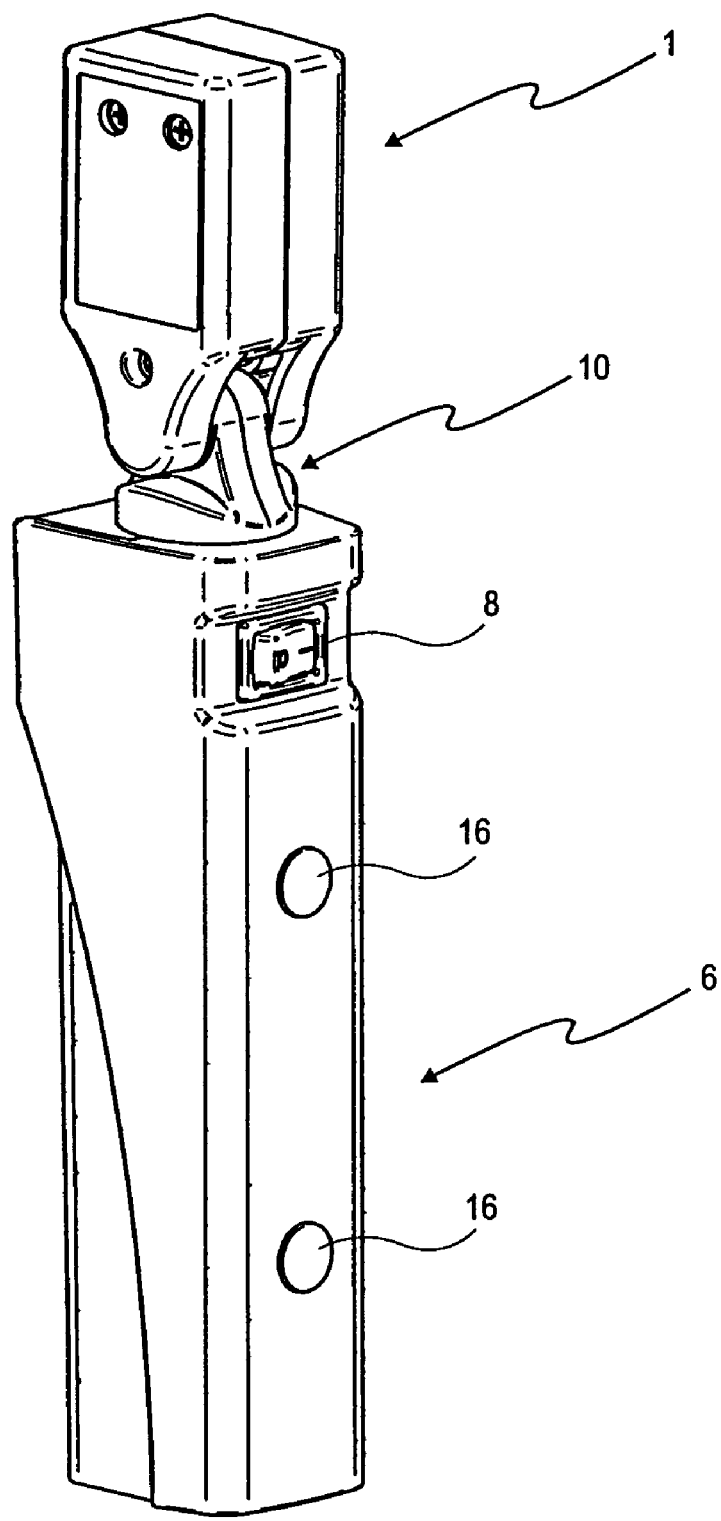

FIG. 8 is a three-dimensional posterior view of the worklight of FIG. 7.

Figure 9:
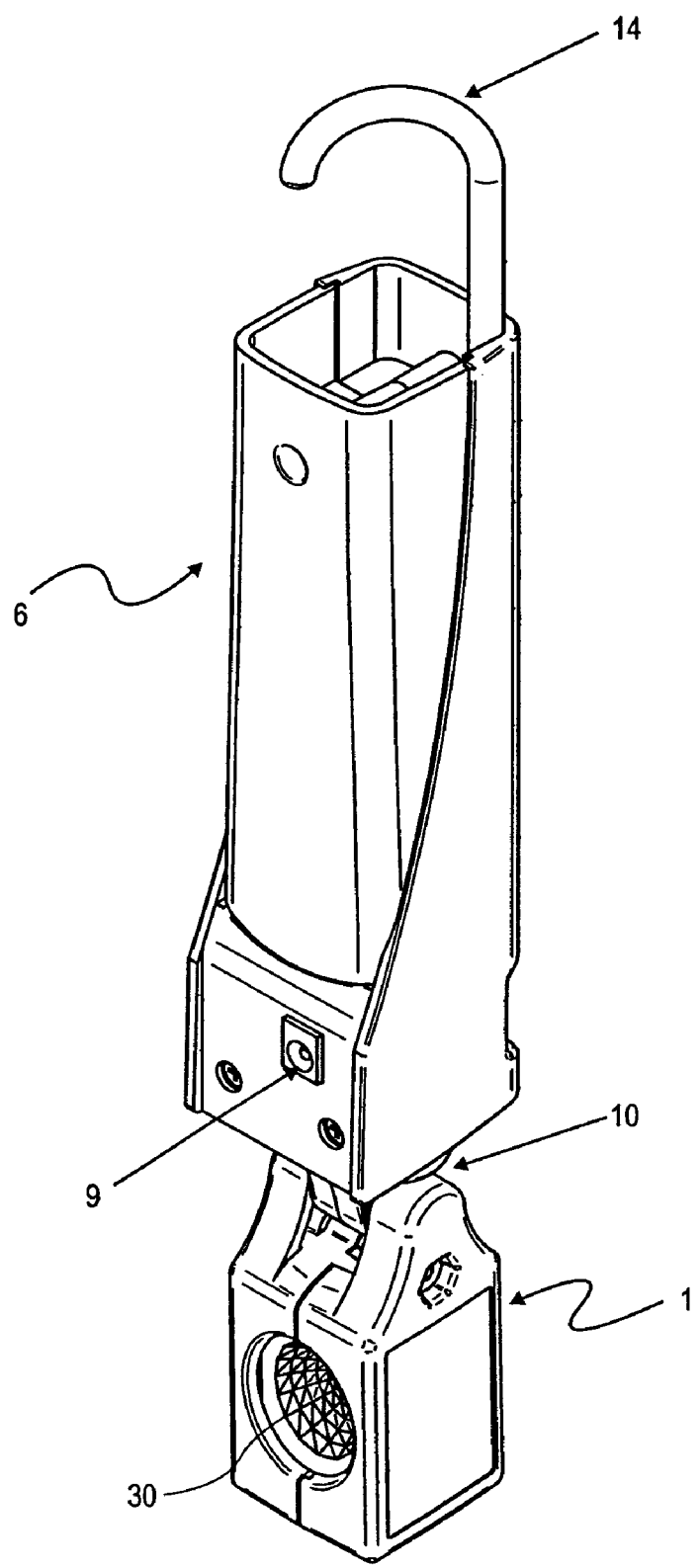

FIG. 9 is a three-dimensional ventral view of the worklight of FIG. 7 with hook member attached.

Figure 10A:
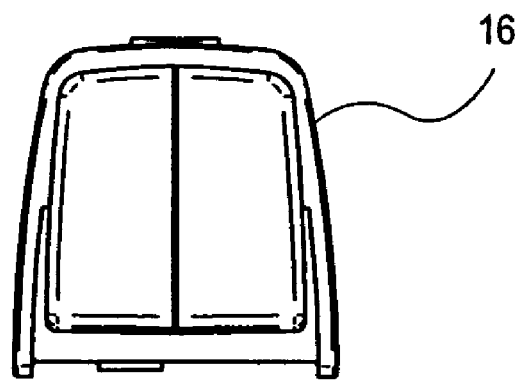
Figure 10B:
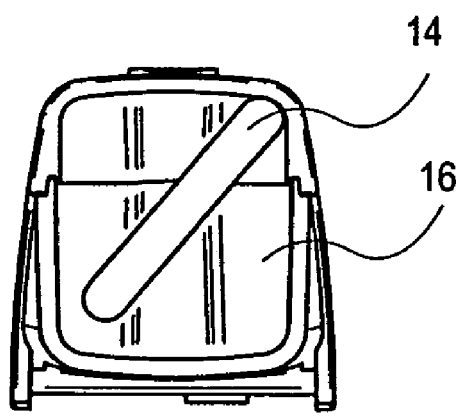

FIG. 10 is a diagrammatic ventral view of the worklight of FIG. 7 wherein FIG. 10A shows the worklight without the hook member attached and FIG. 10B shows the worklight with the hook member attached.

DESCRIPTION

Overview:

The described embodiment combines the latest light emitting diodes (LEDs) and rechargeable battery technology with a unique package that provides a portable high intensity light source that will operate for longer than a working day under typical usage. The rugged construction of the device will allow it to take the abuse typical of a workshop environment without damage.

Two 1 watt LEDs with built in collimator lenses are mounted at an offset angle to provide a high intensity elliptical beam pattern. The operating life of the LEDs is in excess of 100,000 hours so they will not require replacement during the expected life of the device.

The LED current is controlled by an electronic circuit that provides a constant current to the LEDs independent of the battery voltage. This ensures that the light output remains constant over the full battery discharge range, and improves the overall efficiency.

The electronic circuit consists of a switching regulator operating in constant current mode, and a microcontroller that controls the operation of the switching regulator.

General Description of the Mechanical Construction:

The work light consists of four functional sections; a head 1 containing LEDs 2 and 3, heat sink 4, and lens 5, a body 6 containing a battery pack 7, switch 8, electronic circuits, and charging contacts 9, a flexible neck 10 connecting the body 6 and head 1, and a battery charger 11 and charging cradle 12 with charging contacts 13.

The LEDs 2 and 3, with built in collimator lenses, are mounted on a heat sink 4, the LEDs also having the usual heat sinks built in. The LEDs are mounted side by side on the heat sink whereby their longitudinal axes form an acute angle with each other (less than 90°).

The slope of the heat sink sets the offset angle of LEDs 2 and 3 to eight degrees, this angle being approximately equal to the 80% relative intensity angular displacement angle of the collimated beam. This offset angle results in an elliptical beam pattern with no perceptible hole between the LED beams.

The operating life of the LEDS is in excess of 100,000 hours so they should not need to be replaced during the expected working life of the work light. The lens 5 protects LEDs 2 and 3 and may be flat or formed to further shape the beam pattern.

The battery pack 7 is contained within the body 6 and consists of eight AA size rechargeable nickel-metal-hydride batteries that provide a capacity of 2.1 ampere hours at a nominal 9.6 volts. The battery pack is charged via charging contacts 9 on the side of body 6 that make contact with the charging contacts 13 of charging cradle 12 when the work light is clipped into it. Alternatively, fuel cell technology may be used.

The total energy available is approximately 20 watt-hours, which will provide up to eight hours of continuous use assuming 85% efficiency. A low voltage cut-off is provided to prevent complete discharge of the battery pack, which will sustain in excess of 1,000 charge/discharge cycles.

A detachable magnet hook member 14 is provided to facilitate hanging the work light from a suitable support to illuminate the work area. The attachment is via integral magnets 16 in the body 6. An alternate location for the hook member 14 is shown at 15 so that the work light may be suspended vertically or horizontally.

Integral magnets 16 are provided to allow attachment of the work light to a ferrous surface adjacent to the work area (not shown).

Flexible neck 10 allows the head 1 to be tilted and rotated relative to the body 6 so as to direct the light onto the work area.

Microcontroller 17 allows the use of a momentary-action switch 8 rather than a straight on/off switch, momentary-action switches generally being smaller, cheaper, and more reliable. Microcontroller 17 also allows intelligent control of the work light so that the user may select various beam intensities and have the work light remember the last intensity used.

General Description of the Circuit Operation:

The batteries supply the current to the LEDs 2 and 3 at a constant rate via an electronic circuit generally referred to as a switching regulator. The principle of operation is that the supply to the load (LEDs in this case) is turned on and off at a rapid rate with the on/off ratio being adjusted to give the desired average current into the load.

The embodiment used here utilizes a converter whereby a higher voltage at low current is converted to a lower voltage at higher current.

In FIG. 6 the MOSFET transistor 18 is switched on and off by the voltage comparator 19. The voltage comparator 19 compares the voltage across the current sensing resistor 20 with a reference voltage from microcontroller 17.

When the voltage across the sensing resistor 20, part of a sensing circuit, is below the reference voltage, the voltage comparator 19 turns transistor 18 on. When the voltage across the sensing resistor 20 rises above the reference voltage the voltage comparator 19 turns transistor 18 off. The inductor 21 acts to average the on/off current pulses through the LEDS 2 and 3 and sensing resistor 20, the diode 22 provides a discharge path for inductor 21 when transistor 18 is turned off.

Resistor 23 and capacitor 24, together with inductor 21, form a time constant that sets the operating frequency of the switching regulator.

Microcontroller 17 controls the current through LEDs 2 and 3 and hence the light output by varying the reference voltage to comparator 19. The microcontroller determines the required current based on the operation of switch 8 and the voltage of the battery pack 7.

Switch 8 is a momentary action switch which connects the Sin input of microcontroller 17 to ground 25 when the switch is pressed. Microcontroller 17 interprets the period of time, and the number of times that switch 8 is pressed to determine the light intensity the user desires.

Resistor 26 and 27 divide the battery voltage by two and apply this voltage to the Vbat input of Microcontroller 17. Microcontroller 17 monitors this voltage and flashes LEDs 2 and 3 on and off to warn the user when battery pack 7 is getting low, then turns them off when the battery pack 7 reaches 8 volts (1 volt per cell).

Microcontroller 17 turns comparator 19 off during power down via its Coff output.

Voltage regulator 28 supplies a constant 5 volts to the Vdd (supply voltage) input of microcontroller 17.

Ni-MH battery charger 11 connects to the 115 Volt (nominal AC supply) (not shown) and charges battery pack 7 via charger cradle 12 and charging contacts 13. Charging contacts 9 on body 6 are recessed, and are on opposite sides of body 6, to prevent accidental shorted circuiting.

A single LED 29 may be used together with a shaped reflector 30 to provide an elliptical beam. See FIGS. 7 and 9.

While the invention has been described with reference to specific embodiments, modifications and variations of the invention may be constructed without departing from the scope of the invention, which is defined in the following claims.

What is claimed is:

1. A work light comprising:
   (a) at least one LED and a shaped reflector to provide an elliptical beam;
   (b) said at least one LED being enclosed within a first portion of a housing;
   (c) eight NiMH-AA batteries enclosed within a second portion of said housing;
   (d) said first and second portions being interconnected by a flexible neck portion;
   (e) a hook member enclosed within said second portion of the housing to facilitate hanging the work light from a suitable support;
   (f) two magnets enclosed within said second portion of the housing to facilitate attaching the work light to an adjacent ferrous surface;
   (g) an electronic circuit including a switching regulator connected to provide, in use, a constant current to said at least one LED independent of the voltage supplied by said AA batteries; and
   (h) a sensing circuit to prevent complete discharge of said batteries.

* * * * *